US010853587B2

(12) United States Patent
Okamoto

(10) Patent No.: US 10,853,587 B2
(45) Date of Patent: Dec. 1, 2020

(54) INFORMATION TERMINAL

(71) Applicant: Semiconductor Energy Laboratory Co., Ltd., Atsugi (JP)

(72) Inventor: Yuki Okamoto, Sagamihara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 50 days.

(21) Appl. No.: 15/613,499

(22) Filed: Jun. 5, 2017

(65) Prior Publication Data

US 2017/0357641 A1 Dec. 14, 2017

(30) Foreign Application Priority Data

Jun. 10, 2016 (JP) ................................ 2016-116140

(51) Int. Cl.
*G06F 3/041* (2006.01)
*G06F 40/58* (2020.01)
(Continued)

(52) U.S. Cl.
CPC ........... *G06F 40/58* (2020.01); *H04B 1/0346* (2013.01); *H04H 20/76* (2013.01); *H04N 5/91* (2013.01);
(Continued)

(58) Field of Classification Search
CPC .... G06F 3/041; G06F 3/0412; G06F 3/03542; G06F 3/0386; G06F 3/042;
(Continued)

(56) References Cited

U.S. PATENT DOCUMENTS 5,204,661 A * 4/1993 Hack .................... G06F 3/0412
345/88
6,556,260 B1 4/2003 Itou et al.
(Continued)

FOREIGN PATENT DOCUMENTS

JP 2001-066593 A 3/2001
JP 2002-196702 A 7/2002
(Continued)

OTHER PUBLICATIONS

Minoura.K et al., "P-149: Super Reflective Color LCDs Being Able to Display Moving Images without Polarizers", SID Digest '06 : SID International Symposium Digest of Technical Papers, Jun. 6, 2006, vol. 37, No. 1, pp. 769-772.
(Continued)

*Primary Examiner* — Alexander Eisen
*Assistant Examiner* — Cory A Almeida
(74) *Attorney, Agent, or Firm* — Robinson Intellectual Property Law Office; Eric J. Robinson

(57) ABSTRACT

An information terminal with low power consumption is provided. The information terminal includes a liquid crystal element, a light-emitting element, a first transistor, and a touch sensor. The touch sensor includes a photodiode, a second transistor, and a third transistor. The first transistor has a function of controlling a current flowing through the light-emitting element. The photodiode is electrically connected to a gate of the third transistor through the second transistor. A gate of the first transistor is electrically connected to the gate of the third transistor through at least one transistor.

16 Claims, 12 Drawing Sheets

(51) Int. Cl.
    *H04B 1/034* (2006.01)
    *H04H 20/76* (2008.01)
    *H04N 5/91* (2006.01)
    *H04N 7/173* (2011.01)
    *H04W 88/06* (2009.01)
    *H04N 7/14* (2006.01)

(52) U.S. Cl.
    CPC ........ *H04N 7/17354* (2013.01); *H04W 88/06* (2013.01); *H04N 2007/145* (2013.01)

(58) Field of Classification Search
    CPC ............. G02F 1/13338; G02F 1/13624; H01L 27/3227; H01L 27/323; H01L 27/3262; H01L 27/3265; G09G 3/3233
    See application file for complete search history.

(56) References Cited

U.S. PATENT DOCUMENTS

| | | | |
|---|---|---|---|
| 6,714,268 B2 | 3/2004 | Wang et al. | |
| 6,912,021 B2 | 6/2005 | Kimura | |
| 7,038,641 B2 | 5/2006 | Hirota et al. | |
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 * | 7/2007 | Fujii ................. | G02F 1/133555 345/76 |
| 7,304,696 B2 | 12/2007 | Yamagishi | |
| 7,385,654 B2 | 6/2008 | Mitsui et al. | |
| 7,688,290 B2 | 3/2010 | Yamazaki et al. | |
| 8,040,456 B2 | 10/2011 | Yamazaki et al. | |
| 8,159,449 B2 * | 4/2012 | Kimura ............. | G02F 1/133603 345/102 |
| 8,547,503 B2 | 10/2013 | Kubota et al. | |
| 8,743,028 B2 | 6/2014 | Yamazaki et al. | |
| 8,836,906 B2 | 9/2014 | Kurokawa et al. | |
| 8,854,286 B2 | 10/2014 | Yamazaki et al. | |
| 8,890,781 B2 | 11/2014 | Yamazaki et al. | |
| 9,006,755 B2 | 4/2015 | Seo et al. | |
| 9,165,502 B2 | 10/2015 | Yamazaki et al. | |
| 9,189,997 B2 | 11/2015 | Kimura et al. | |
| 9,368,082 B2 | 6/2016 | Yamazaki et al. | |
| 9,772,702 B2 * | 9/2017 | Kurokawa ............ | G06F 3/042 |
| 9,841,843 B2 * | 12/2017 | Kurokawa ............ | G06F 3/042 |
| 2003/0076295 A1 * | 4/2003 | Nakajima ........... | G06F 3/03545 345/156 |
| 2003/0102801 A1 | 6/2003 | Senbonmatsu | |
| 2003/0201960 A1 | 10/2003 | Fujieda | |
| 2005/0212916 A1 * | 9/2005 | Nakamura ........... | G06F 3/0412 348/207.99 |
| 2005/0285822 A1 * | 12/2005 | Reddy ................. | G06F 3/03542 345/76 |
| 2006/0072047 A1 | 4/2006 | Sekiguchi | |
| 2008/0180618 A1 | 7/2008 | Fujieda | |
| 2008/0259051 A1 * | 10/2008 | Ota ....................... | G06F 3/0412 345/175 |
| 2009/0141004 A1 * | 6/2009 | Yamazaki ............ | G06F 3/0412 345/175 |
| 2010/0171905 A1 | 7/2010 | Huang et al. | |
| 2011/0216023 A1 * | 9/2011 | Kurokawa ........... | G06F 3/0412 345/173 |
| 2011/0221723 A1 | 9/2011 | Kurokawa et al. | |
| 2011/0255046 A1 | 10/2011 | Kurokawa et al. | |
| 2012/0092302 A1 * | 4/2012 | Imai ..................... | G06F 3/0412 345/175 |
| 2012/0208637 A1 | 8/2012 | Hirakata | |
| 2014/0146033 A1 | 5/2014 | Koyama et al. | |
| 2015/0179139 A1 | 6/2015 | Watanabe et al. | |
| 2016/0012783 A1 | 1/2016 | Kimura et al. | |
| 2016/0041428 A1 | 2/2016 | Hirakata et al. | |
| 2016/0042696 A1 | 2/2016 | Hirakata et al. | |
| 2016/0042702 A1 | 2/2016 | Hirakata et al. | |
| 2017/0103714 A1 * | 4/2017 | Yamamoto .......... | G02F 1/13306 |

FOREIGN PATENT DOCUMENTS

| | | |
|---|---|---|
| JP | 2003-157026 | 5/2003 |
| JP | 2004-296162 A | 10/2004 |
| JP | 2007-232882 A | 9/2007 |
| JP | 2011-141522 | 7/2011 |
| JP | 2011-141524 | 7/2011 |
| JP | 2011-210254 | 10/2011 |
| JP | 2013-221965 A | 10/2013 |

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.

Lee.J et al., "High ambient-contrast-ratio display using tandem reflective liquid crystal display and organic light-emitting device", Optics Express, Nov. 14, 2005, vol. 13, No. 23, pp. 9431-9438.

K.Kusunoki et al., "Transmissive OLED and Reflective LC Hybrid (TR-Hybrid) Display," SID Digest '16 : SID International Symposium Digest of Technical Papers, vol. 47, p. 57-60.

T.Sakuishi et al., "Transmissive OLED and Reflective LC Hybrid (TR-Hybrid) Display with High Visibility and Low Power Consumption," vol. 47, p. 735-738.

T.Ohide et al., "Application of Transfer Technology to Manufacturing of Transmissive OLED and Reflective LC Hybrid (TR-Hybrid) Display," SID Digest '16 : SID International Symposium Digest of Technical Papers, vol. 47, p. 1002-1004.

* cited by examiner

10

INFORMATION TERMINAL

BACKGROUND OF THE INVENTION

1. Field of the Invention

One embodiment of the present invention relates to an information terminal.

Furthermore, one embodiment of the present invention relates to a semiconductor device. Note that one embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter.

In this specification and the like, a semiconductor device generally means a device that can function by utilizing semiconductor characteristics. In some cases, a memory device, a display device, a light-emitting device, a memory device, an electro-optical device, a semiconductor circuit, and an electronic device includes a semiconductor device.

2. Description of the Related Art

A display device in which a reflection-type element and a light emission type element are combined has been proposed (Patent Document 1). The reflection-type element is used in bright environments and the light emission type element is used in dark environments, so that it is possible to achieve high display quality independent of environment light and to provide a low power consumption display device.

A technique for using an oxide semiconductor transistor (hereinafter, referred to as an OS transistor) for a display device such as a liquid crystal display or an organic electroluminescence (EL) display has attracted attention.

An OS transistor has an extremely low off-state current. With the use of such an extremely low off-state current, the refresh frequency at the time of displaying still images is reduced, resulting in reduction in power consumption of liquid crystal displays or organic EL displays. Such a technique has been disclosed (Patent Document 2 and Patent Document 3). Note that the aforementioned technique for reducing the power consumption of the display device is referred to as idling stop in this specification.

Patent Document 4 discloses an example in which a liquid crystal display and an optical touch sensor are formed with an OS transistor.

REFERENCE

Patent Document

[Patent Document 1] Japanese Published Patent Application No. 2003-157026
[Patent Document 2] Japanese Published Patent Application No. 2011-141522
[Patent Document 3] Japanese Published Patent Application No. 2011-141524
[Patent Document 4] Japanese Published Patent Application No. 2011-210254

SUMMARY OF THE INVENTION

An object of one embodiment of the present invention is to provide an information terminal with low power consumption. Another object of one embodiment of the present invention is to provide an information terminal with high visibility. Another object of one embodiment of the present invention is to provide a novel information terminal. Another object of one embodiment of the present invention is to provide a novel semiconductor device.

Note that the description of a plurality of objects does not mutually preclude the existence. One embodiment of the present invention does not necessarily achieve all the objects. Objects other than those listed above are apparent from the description of the specification, drawings, and claims, and also such objects could be an object of one embodiment of the present invention.

One embodiment of the present invention is an information terminal including a display panel including a light-emitting element, a first transistor, and a touch sensor. The touch sensor includes a photodiode, a second transistor, and a third transistor. The first transistor has a function of controlling a current flowing through the light-emitting element. The photodiode is electrically connected to a gate of the third transistor through the second transistor. A gate of the first transistor is electrically connected to the gate of the third transistor through at least one transistor.

In the above embodiment, the touch sensor has a function of sensing handwritten information which a user inputs. The information is preferably displayed by the light-emitting element.

In the above embodiment, each of the first to third transistors preferably includes an oxide semiconductor in a channel formation region.

Another embodiment of the present invention is an information terminal including a liquid crystal element, a light-emitting element, a first transistor, and a touch sensor. The touch sensor includes a photodiode, a second transistor, and a third transistor. The first transistor has a function of controlling a current flowing through the light-emitting element. The photodiode is electrically connected to a gate of the third transistor through the second transistor. A gate of the first transistor is electrically connected to the gate of the third transistor through at least one transistor.

In the above embodiment, the liquid crystal element displays an image, and the touch sensor has a function of sensing handwritten information which is input by a user and added to the image. The information is preferably displayed by the light-emitting element.

In the above embodiment, the liquid crystal element is preferably a reflective liquid crystal element.

In the above embodiment, each of the first to third transistors preferably includes an oxide semiconductor in a channel formation region.

According to one embodiment of the present invention, an information terminal with low power consumption can be provided. According to one embodiment of the present invention, an information terminal with high visibility can be provided. According to one embodiment of the present invention, a novel information terminal can be provided. According to one embodiment of the present invention, a novel semiconductor device can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

DETAILED DESCRIPTION OF THE INVENTION

Figure 1:
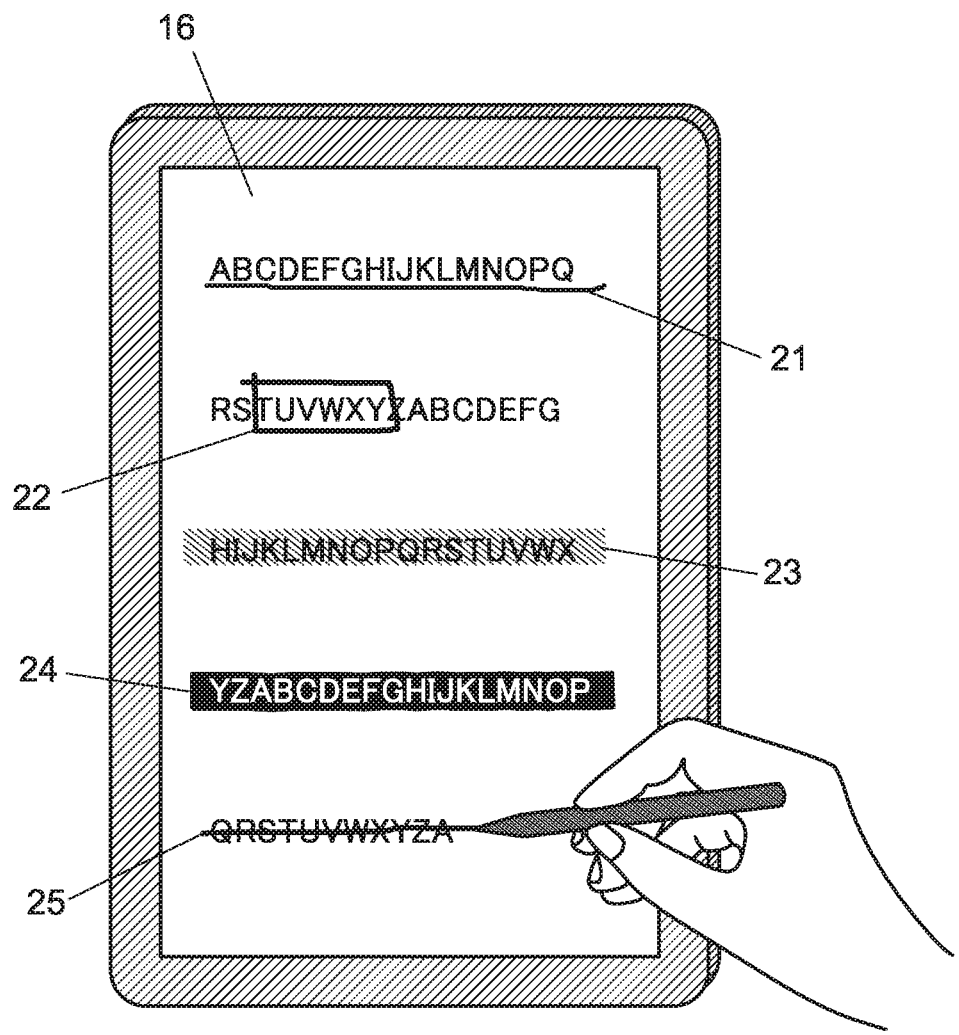
FIG. 1 is a diagram illustrating an embodiment and a usage example of an information terminal.

Hereinafter, embodiments will be described with reference to drawings. It will be readily appreciated by those skilled in the art that modes and details can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, the size, the layer thickness, or the region is not limited to the illustrated scale. Note that the drawings are schematic views showing ideal examples, and embodiments of the present invention are not limited to shapes or values shown in the drawings.

Note that in this specification, a high power supply voltage and a low power supply voltage are sometimes referred to as an H level (or $V_{DD}$) and an L level (or GND), respectively.

Furthermore, in the present specification, any of the embodiments described below can be combined as appropriate. In addition, in the case where a plurality of structure examples are described in one embodiment, some of the structure examples can be combined as appropriate.

Embodiment 1

In this embodiment, an information terminal of one embodiment of the present invention is described.
<<Information Terminal 10>>

FIG. 1 illustrates an embodiment and a usage example of an information terminal 10. The information terminal 10 includes a display region 16.

The display region 16 has a function of displaying information such as images and letters. The display region 16 includes a touch sensor. A user of the information terminal 10 can input information such as letters, lines, and diagrams with a finger, a stylus, or the like. Handwritten information which the user inputs is sensed by the touch sensor incorporated in the display region 16 and displayed on the display region 16.

FIG. 1 illustrates an example in which the user makes marks on letters displayed on the display region 16 in order to emphasize or eliminate predetermined letters. FIG. 1 illustrates an underline 21, a diagram 22, a highlight 23, a highlight 24, and a strike-through 25 as examples of the marks. The highlight 23 functions in the same manner as a highlighter for tracing letters written on paper. Colors of letters traced with the highlight 24 can be changed.

Colors of the above marks can be selected freely by the user.

Next, an example of a module included in the information terminal 10 is described with reference to FIG. 10.

Figure 10:
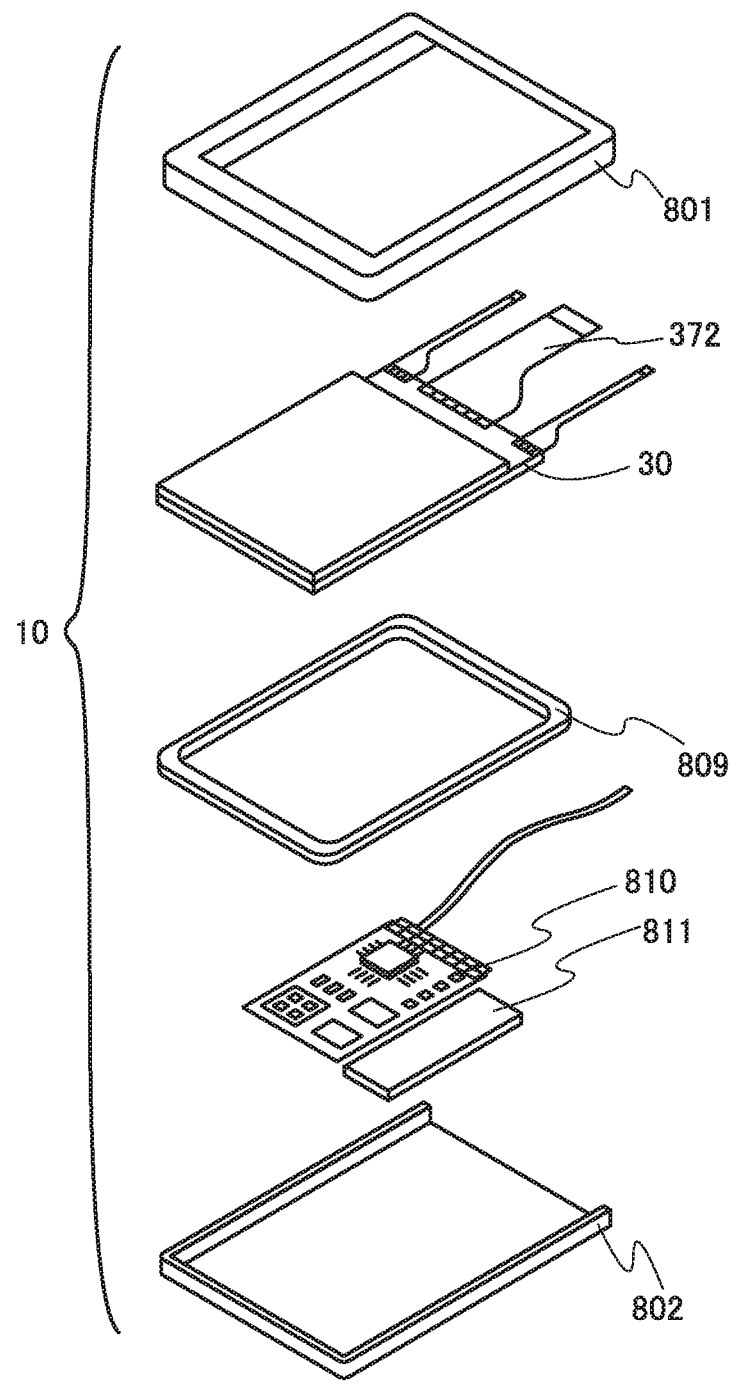
FIG. 10 is a diagram illustrating an example of a module of an information terminal.

The information terminal 10 illustrated in FIG. 10 includes, between an upper cover 801 and a lower cover 802, a display panel 30 connected to an FPC 372, a frame 809, a printed circuit board 810, and a battery 811. The shapes and sizes of the upper cover 801 and the lower cover 802 can be changed as appropriate in accordance with the size of the display panel 30.

Figure 2A:
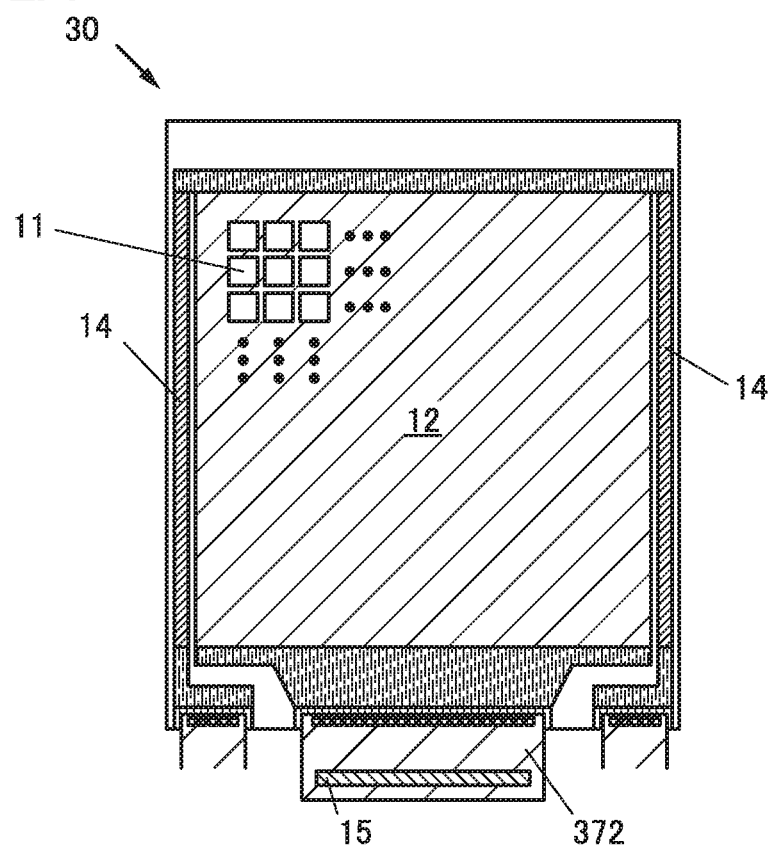
FIG. 2A is a top view of a structure example of a display panel.

FIG. 2A is a top view illustrating a structure example of the display panel 30 included in the information terminal 10. The display panel 30 includes a pixel array 12, the FPC 372, a gate driver 14, and a source driver 15. The pixel array 12 includes the pixels 11 arranged in a matrix.

Figure 2B:
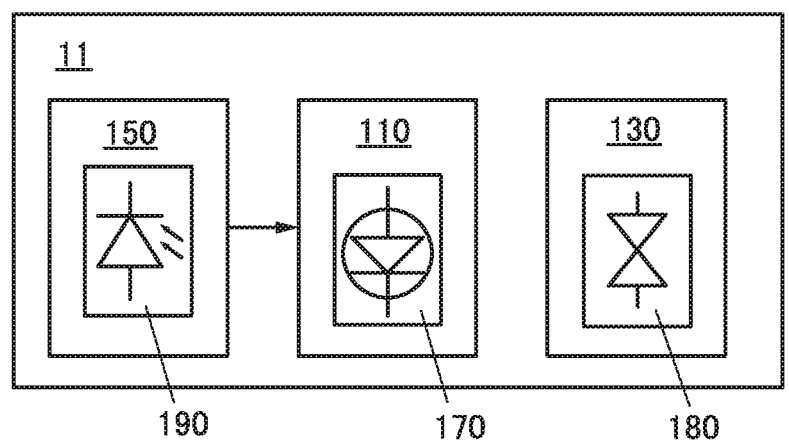
FIG. 2B is a block diagram illustrating a structure example of a pixel.

FIG. 2B is a block diagram illustrating a structure example of the pixel 11. The pixel 11 includes a sensing pixel 150, a display pixel 110, and a display pixel 130. The display pixels 110 and 130 each have a function as a display portion of the information terminal 10. The sensing pixel 150 has a function as a touch sensor of the information terminal 10.

The sensing pixel 150 includes a photodiode 190 and has a function as an optical touch sensor. The sensing pixel 150 senses the intensity of light with which the photodiode 190 is irradiated and the approach or contact of an object such as a finger or a stylus.

The display pixel 110 includes a light-emitting element 170. As the light-emitting element 170, an organic EL element, an inorganic EL element, a light-emitting diode, quantum-dot light-emitting diode (QLED), or the like can be used. An organic EL element is particularly preferable because a display element having low power consumption and a large area can be achieved. Note that the light-emitting element 170 is described below as an organic EL element.

The display pixel 130 includes a liquid crystal element 180. A reflective liquid crystal element is preferably used as the liquid crystal element 180. The use of a reflective liquid crystal element can reduce the power consumption. In addition, an image with high contrast can be favorably displayed under an environment with bright external light. Instead of the liquid crystal element 180, a micro electro mechanical systems (MEMS) shutter element, an optical interference type MEMS element, or a display element which displays an image using external light reflection by a microcapsule method, an electrophoretic method, an electrowetting method, an Electronic Liquid Powder (registered trademark) method, or the like may be used. Note that the liquid crystal element 180 is described below as a reflective liquid crystal element.

The description hereinafter is made on the assumption that the information terminal 10 is used under extremely bright external light and that display by the reflective liquid crystal element is recognizable by the user of the information terminal 10.

In the case where the information terminal 10 is used as a schoolbook, for example, letters and images of the schoolbook are preferably displayed by the display pixel 130. In the case of the example of FIG. 1, the letters displayed on the display region 16 are preferably displayed by the display pixel 130. When a reflective liquid crystal element is used for the display pixel 130, the user of the information terminal 10 can have the same feeling as he/she has in reading a paper schoolbook and can feel less fatigue even after long time use. Furthermore, a reflective liquid crystal element has low power consumption, leading to low power consumption of a battery in the information terminal 10 even after long time use.

In the case where the information terminal 10 is used as a schoolbook, for example, it is preferable that a mark or the like added to the schoolbook by the user be sensed by the sensing pixel 150 and displayed by the display pixel 110. In the case of the example of FIG. 1, the marks such as the underline 21, the diagram 22, the highlight 23, the highlight 24, and the strike-through 25 are preferably displayed by the display pixel 110. When an organic EL element is used in the display pixel 110, only a region of the display pixel 110 where the organic EL element emits light consumes power. In FIG. 1, the area where the marks are displayed is small with respect to the entire display region. When only the region of the above marks emits light and the other region emits no light, power consumption of the information terminal 10 can be greatly reduced.

The marks are displayed by the light-emitting element and thus are likely to be distinguished from the letters displayed by the reflective liquid crystal element. As a result, the marks can be recognized clearly in the information terminal 10, and thus the information terminal 10 can have high visibility.

Figure 11:
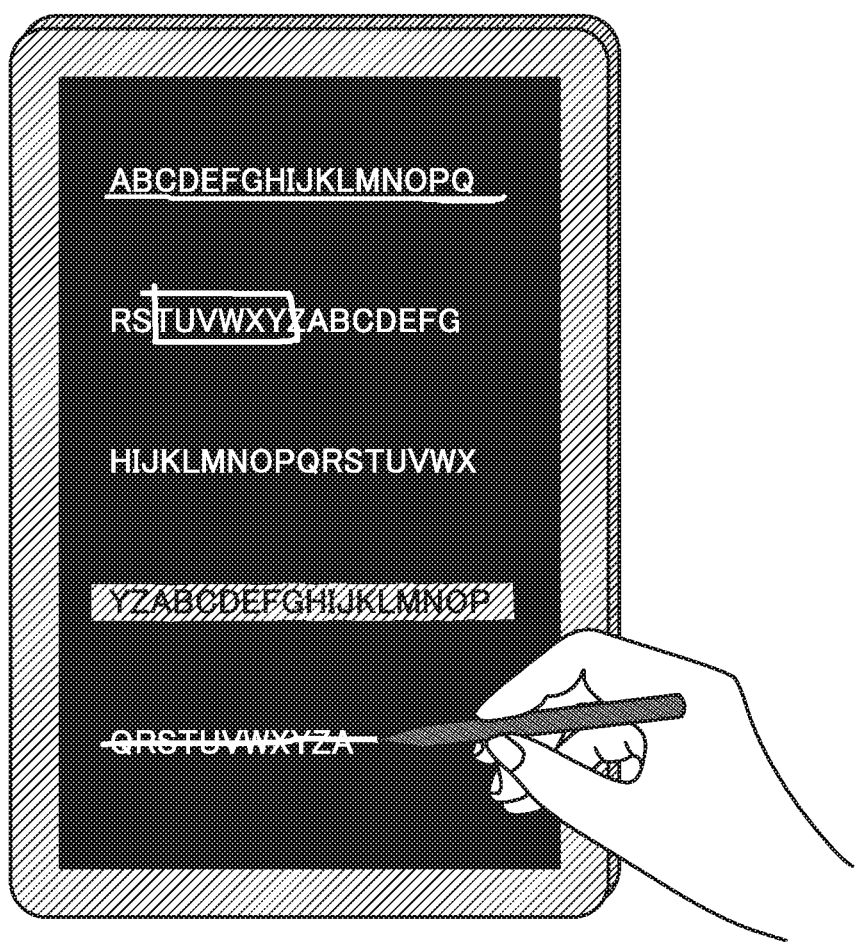
FIG. 11 is a diagram illustrating an embodiment and a usage example of an information terminal.

In the information terminal 10, a background color of the display region or a color of letters can be changed in accordance with the usage environment. FIG. 1 illustrates an example in which black letters are displayed in a white background. In this case, when external light is too bright, the visibility of the marks displayed by the light-emitting element may be reduced. In that case, it is preferable that the background color and the color of the letters be changed to black and white, respectively (see FIG. 11). When the background color is changed to black in this manner, the visibility of the marks can be improved even under bright external light.

In the case where a transmissive liquid crystal element is used as the liquid crystal element 180, the photodiode 190 senses light of a backlight, and thus sensing of the sensing pixel 150 is not performed correctly in some cases. When a reflective liquid crystal element is used as the liquid crystal element 180, the photodiode 190 is not affected by the backlight, so that the sensing pixel 150 can perform sensing with high accuracy.

In each of the display pixels 130 and 110, a transistor including an oxide semiconductor in a channel formation region (the transistor is also referred to as an OS transistor) is preferably used. When an OS transistor is used in each of the display pixels 130 and 110, the above idling stop becomes possible, and thus power consumption of the information terminal 10 can be suppressed.

The area of the pixel 11 is preferably sufficiently small with respect to a finger or a stylus with which touch is performed. Since the sensing pixel 150 is provided in each of the pixels 11 in the information terminal 10, the distance between the adjacent sensing pixels 150 is small. Accordingly, the sensing pixel 150 has high accuracy, and thus input can be performed even with a stylus having a thin tip.

《Pixel 11》

Next, a circuit structure example of the pixel 11 is described with reference to the circuit diagram of FIG. 3.

<Display Pixel 130>

Figure 3:
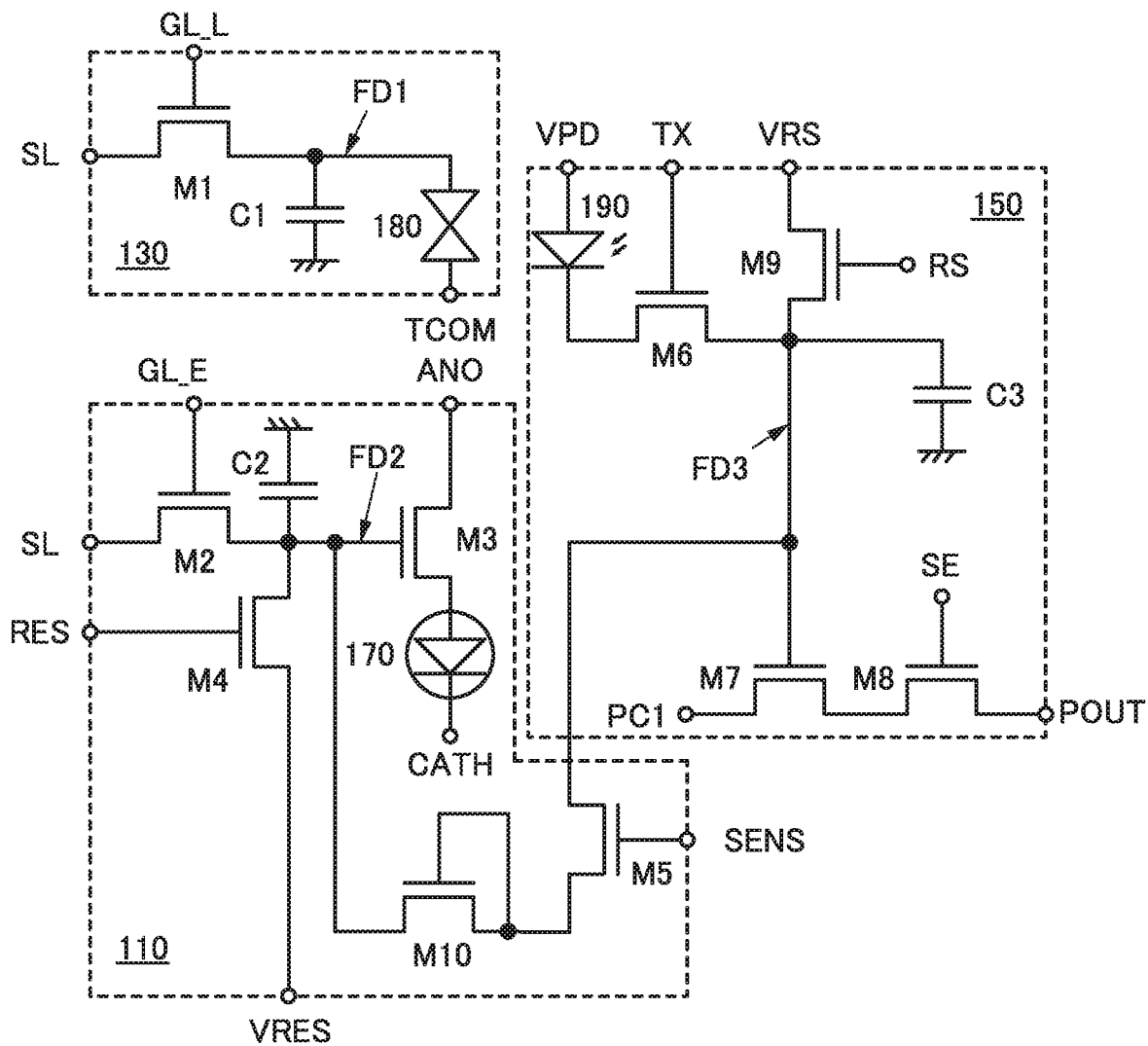
FIG. 3 is a circuit diagram illustrating a structure example of a pixel.

In FIG. 3, the display pixel 130 includes a transistor M1, a capacitor C1, and the liquid crystal element 180. A first terminal of the liquid crystal element 180 is referred to as a node FD1.

The transistor M1 has a function as a switch and has a function of controlling electrical continuity between a wiring SL and the node FD1. The on/off state of the transistor M1 is controlled by a potential supplied to a wiring GL_L. A second terminal of the liquid crystal element 180 is electrically connected to a wiring TCOM. A constant potential is supplied to the wiring TCOM.

The capacitor C1 has a function of retaining a charge that is written to the node FD1.

The wiring SL has a function as a signal line. The wiring GL_L has a function as a scan line.

When the transistor M1 is turned on, video data (analog data) is written from the wiring SL to the node FD1. The alignment of the liquid crystal is changed in response to the charge written to the node FD1, so that the light transmittance of the liquid crystal element 180 is changed.

<Display Pixel 110>

In FIG. 3, the display pixel 110 includes a transistor M2, a transistor M3, a transistor M4, a transistor M5, a transistor M10, a capacitor C2, and the light-emitting element 170. Note that a gate of the transistor M3 is referred to as a node FD2.

The transistors M2 and M4 each have a function as a switch. The transistor M2 has a function of controlling electrical continuity between the wiring SL and the node FD2. The on/off state of the transistor M2 is controlled by a potential supplied to a wiring GL_E. The transistor M4 has a function of controlling electrical continuity between a wiring VRES and the node FD2. The on/off state of the transistor M4 is controlled by a potential supplied to a wiring RES. One of a source and a drain of the transistor M3 is electrically connected to a wiring ANO, and the other of the source and the drain of the transistor M3 is electrically connected to a first terminal of the light-emitting element 170. A second terminal of the light-emitting element 170 is electrically connected to a wiring CATH.

The capacitor C2 has a function of retaining a charge that is written to the node FD2.

A reset signal which initializes the potential of the node FD2 is supplied to the wiring RES. When the transistor M4 is turned on, the potential of the node FD2 is initialized.

The transistor M3 is a driving transistor of the light-emitting element 170 and has a function of controlling a current flowing through the light-emitting element 170 in accordance with the potential of the node FD2.

The wiring ANO has a function as an anode, and the wiring CATH has a function as a cathode. The wiring ANO is preferably supplied with a higher potential than the wiring CATH.

The wiring SL has a function as a signal line, and the wiring GL_E has a function as a scan line.

When the transistor M2 is turned on, video data (analog data) is written from the wiring SL to the node FD2. The transistor M3 allows a drain current to flow in accordance with a potential of the node FD2. The light-emitting element 170 emits light in accordance with the drain current.

Figure 12:
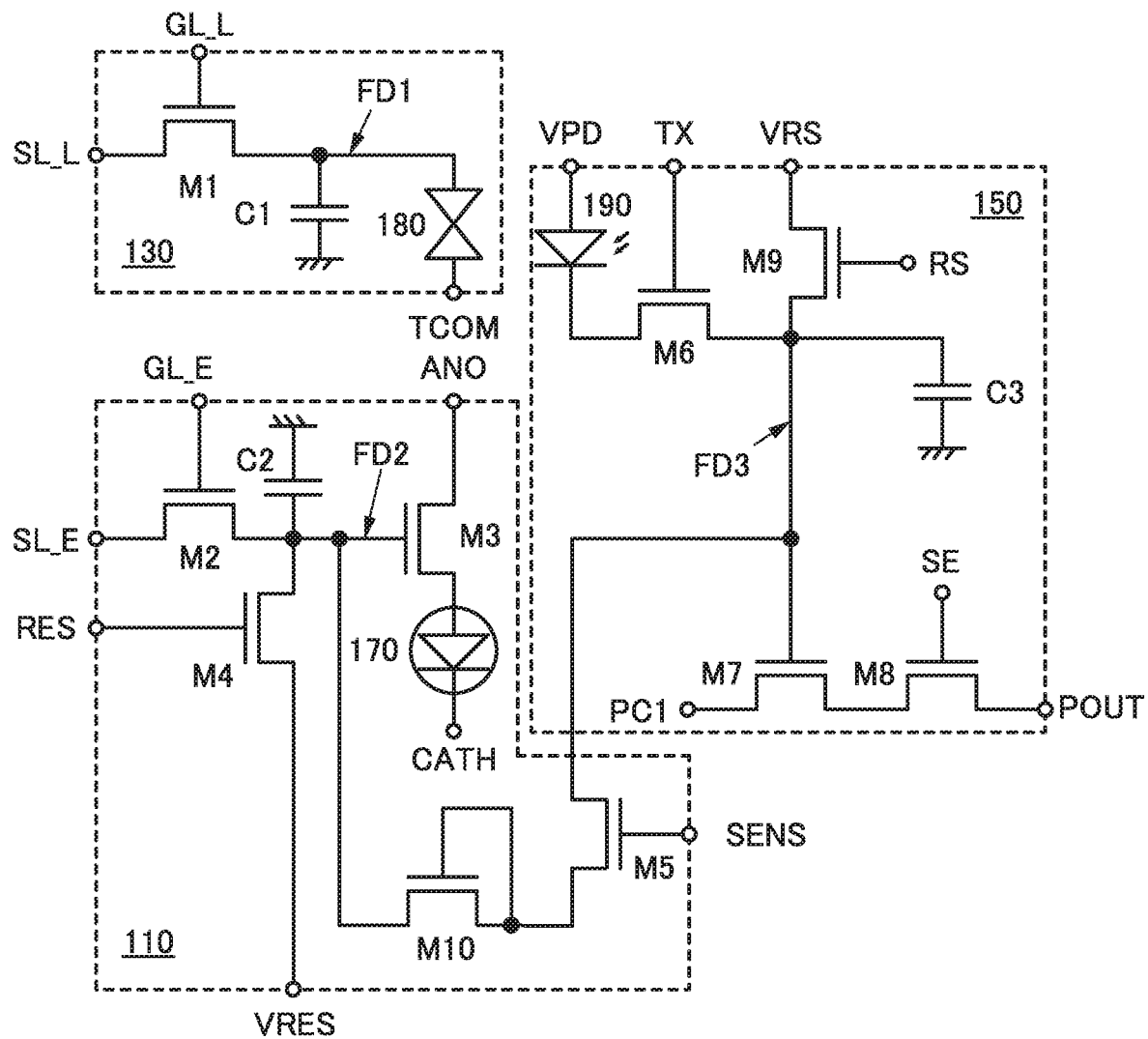
FIG. 12 is a circuit diagram illustrating a structure example of a pixel.

Note that although the signal line (the wiring SL) is used in common between the display pixels 130 and 110 in FIG. 3, the display pixels 130 and 110 may be connected to different signal lines. For example, a wiring SL_L may be provided as a signal line of the display pixel 130, and a wiring SL_E may be provided as a signal line of the display pixel 110 (see FIG. 12). With such a structure, the display pixels 130 and 110 can be driven independently of each other.

<Sensing Pixel 150>

The sensing pixel 150 in FIG. 3 includes a transistor M6, a transistor M7, a transistor M8, a transistor M9, a capacitor C3, and the photodiode 190. Note that a gate of the transistor M7 is referred to as a node FD3.

The transistors M6, M8, and M9 each have a function as a switch. The transistor M6 has a function of controlling electrical continuity between a first terminal of the photodiode 190 and the node FD3. The on/off state of the transistor M6 is controlled by a potential supplied to the wiring TX. The transistor M8 has a function of controlling electrical continuity between one of a source and a drain of the transistor M7 and a wiring POUT. The on/off state of the transistor M8 is controlled by a potential supplied to a wiring SE. The transistor M9 has a function of controlling electrical continuity between a wiring VRS and the node FD3. The on/off state of the transistor M9 is controlled by a potential supplied to a wiring RS. A second terminal of the photodiode 190 is electrically connected to a wiring VPD. The other of the source and the drain of the transistor M7 is electrically connected to a wiring PC1.

The capacitor C3 has a function of retaining a potential of the node FD3.

The photodiode 190 has a function of making a photocurrent flow in accordance with the amount of irradiation light. In the case where the transistor M6 is on, the potential of the node FD3 is changed in accordance with the photocurrent flowing through the photodiode 190.

The transistor M7 has a function of amplifying data supplied to the node FD3. A drain current of the transistor M7 is determined in accordance with the potential of the node FD3 (the channel resistance is determined).

The wiring SE has a function as a scan line, and the wiring POUT has a function as a signal line. When the transistor M8 is turned on, a current flows between the wiring PC1 and the wiring POUT, and thus the potential of the wiring POUT is changed. That is, the potential of the wiring POUT is changed in accordance with the potential of the node FD3.

The wiring VRS has a function as a power supply line and is supplied with one of a high power supply potential and a low power supply potential. Similarly, the wiring VPD has a function as a power supply line and is supplied with the other of the high power supply potential and the low power supply potential.

The wiring RS is supplied with a reset signal which initializes the potential of the node FD3. When the transistor M9 is turned on, the potential of the node FD3 is initialized.

Next, a description is made on operation of the photodiode 190 and the transistors in the vicinity thereof. Note that the following description is made on the assumption that the high power supply potential (H level) is supplied to the wiring VRS, and the low power supply potential (L level) is supplied to the wiring VPD.

First, initialization operation is performed by turning on the transistor M9. An H-level potential is written to the node FD3.

Next, the transistor M6 is turned on. When the photodiode 190 is irradiated with light at this time, a photocurrent is generated in accordance with the amount of the irradiation light. The photocurrent flows from the node FD3 to the wiring VPD through the transistor M6 and the photodiode 190. The potential of the node FD3 is lowered in accordance with the amount of the photocurrent.

Next, the decrease in the potential of the node FD3 is stopped by turning off the transistor M6. Finally, the potential of the node FD3 becomes a potential between the H level (the potential of the wiring VRS) and the L level (the potential of the wiring VPD).

In the case where the sensing pixel 150 is touched by a finger or a stylus, for example, the photodiode 190 is shielded from light. A photocurrent of the photodiode 190 does not flow in such a state, and therefore, decrease in the potential of the node FD3 is not caused, and thus the potential of the node FD3 is held at the H level.

In FIG. 3, the node FD3 in the sensing pixel 150 is electrically connected to the node FD2 in the display pixel 110 through the transistor M5 and the transistor M10.

The transistor M5 has a function as a switch. The transistor M5 has a function of controlling electrical continuity between the node FD3 and the node FD2. The on/off state of the transistor M5 is controlled by a potential supplied to a wiring SENS.

The transistor M10 has a function as a diode and prevents a charge written to the node FD2 from flowing into the node FD3.

When the transistor M5 is turned on, electrical continuity is established between the node FD3 and the node FD2. When the node FD3 has the H-level potential at this time, the potential of the node FD2 also becomes the H-level potential, so that the transistor M3 is turned on. As a result, the light-emitting element 170 emits light. That is, in the information terminal 10, information sensed by the sensing pixel 150 can be transmitted to the display pixel 110 without through a special external circuit. Since a special external circuit is not necessary, the circuit structure of the information terminal 10 can be simplified.

The transistors M1 to M10 preferably have a low current (off-state current) flowing between a source and a drain in an off state. Here, the term "low off-state current" means that a normalized off-state current per micrometer of channel width with a voltage between a source and a drain set at 1.8 V is $1\times10^{-20}$ A or lower at room temperature, $1\times10^{-18}$ A or lower at 85° C., or $1\times10^{-16}$ A or lower at 125° C. An example of a transistor with such a low off-state current is an OS transistor.

OS transistors are used as the transistors M1 to M10, so that the aforementioned idling stop can be performed in the display pixels 110 and 130. As a result, the information terminal 10 with low power consumption can be provided. In the sensing pixel 150, a leakage current flowing from the node FD3 through the transistor can be reduced, so that the accuracy of sensing can be improved.

Examples of oxide semiconductors that can be used for the above OS transistor include an In—Ga oxide, an In—Zn oxide, and an In-M-Zn oxide (M is Ti, Ga, Y, Zr, La, Ce, Nd, Sn, or Hf). Note that the oxide semiconductor is not limited to an oxide containing In. The oxide semiconductor may be, for example, a Zn oxide, a Zn—Sn oxide, or a Ga—Sn oxide.

The OS transistor preferably includes a cloud-aligned composite oxide semiconductor (CAC-OS) in a channel formation region. The OS transistor including a CAC-OS has a high on-state current and is highly reliable. Note that the details of the CAC-OS will be described later in Embodiment 2.

<<Pixel Array 12>>

Figure 4:
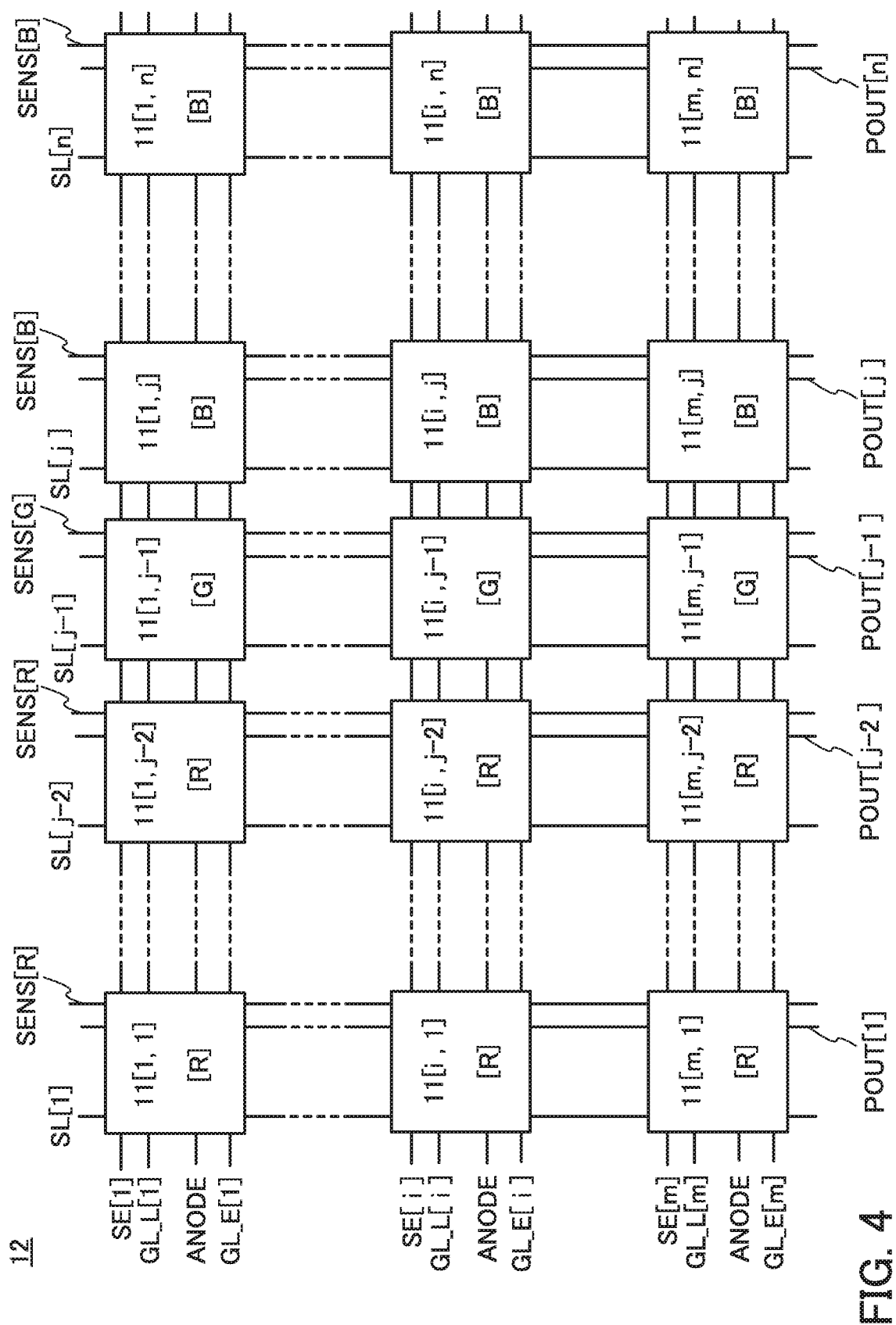
FIG. 4 is a block diagram illustrating a structure example of a pixel array.

FIG. 4 is a block diagram illustrating the pixel array 12. The pixel array 12 in FIG. 4 includes the pixels 11 arranged in a matrix with m rows and n columns (m is an integer of 2 or more and n is an integer of 3 or more and a multiple of 3).

Pixels 11[1,j] to 11[m,j] vertically arranged share a wiring SL[j] and a wiring POUT[j] (j is an integer of more than or equal to 3 and less than or equal to n and a multiple of 3). Similarly, pixels 11[1,j−1] to 11[m,j−1] vertically arranged share a wiring SL[j−1] and a wiring POUT[j−1]. Similarly, pixels 11[1,j−2] to 11[m,j−2] vertically arranged share a wiring SL[j−2] and a wiring POUT[j−2].

Pixels 11[i,1] to 11[i,n] horizontally arranged share a wiring SE[i], a wiring GL_L[i], and a wiring GL_E[i] (i is an integer of more than or equal to 1 and less than or equal to m).

The pixels 11[1,j−2] to 11[m,j−2] have a function of displaying red ([R] in the drawing) and are electrically connected to a wiring SENS[R].

The pixels 11[1,j−1] to 11[m,j−1] have a function of displaying green ([G] in the drawing) and are electrically connected to a wiring SENS[G].

The pixels 11[1,j] to 11[m,j] have a function of displaying blue ([B] in the drawing) and are electrically connected to a wiring SENS[B].

As described above, there are three kinds of wirings SENS, i.e., the wiring SENS[R], the wiring SENS[G], and the wiring SENS[B]. These wirings can supply signals independently.

<<Peripheral Circuit>>

Next, the pixel array 12 and its peripheral circuits are described with reference to FIG. 5.

Figure 5:
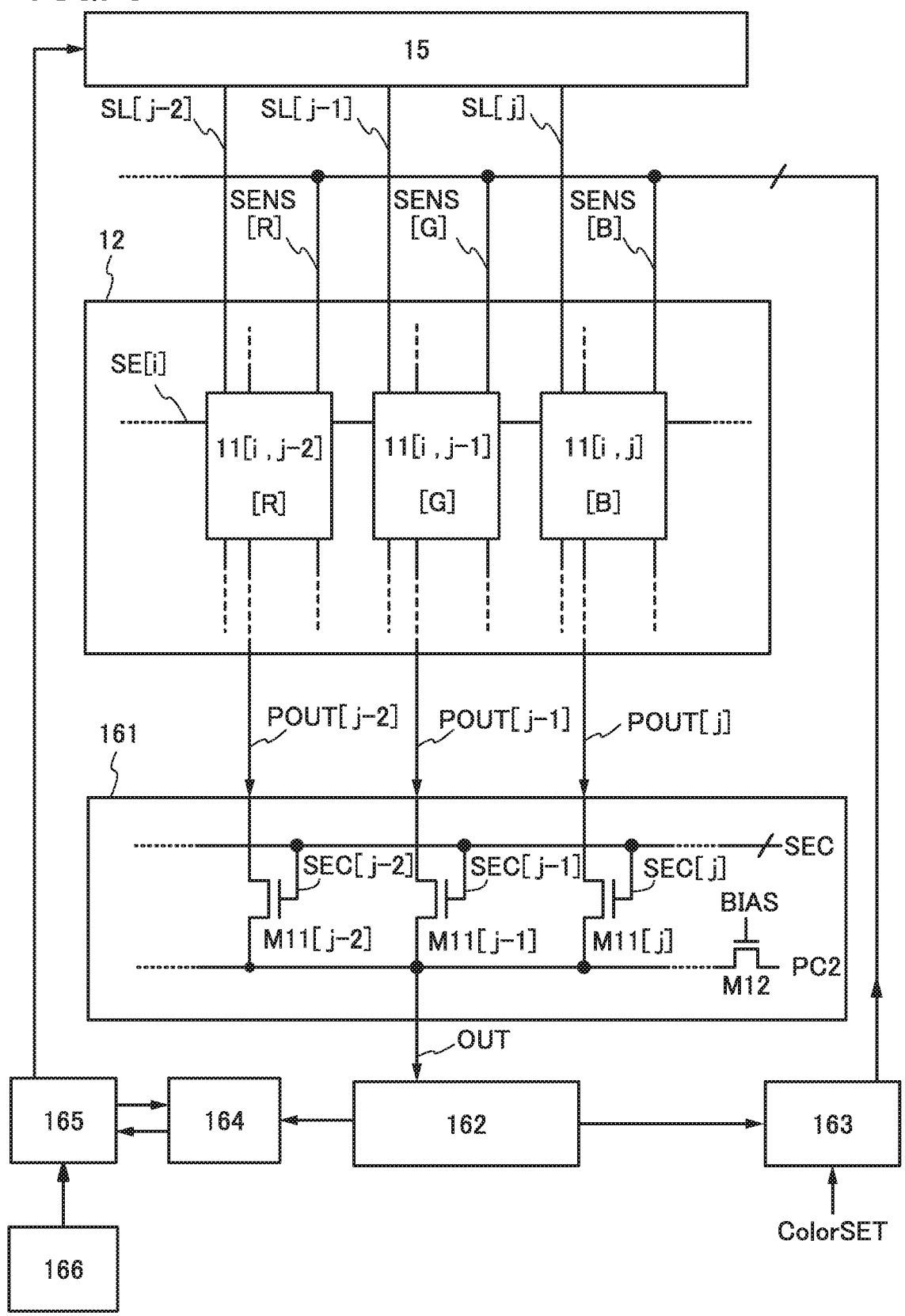
FIG. 5 is a block diagram illustrating a pixel array and its peripheral circuits.

FIG. 5 illustrates the source driver 15, the pixel array 12, a multiplexer 161, an A/D converter 162, a logic circuit 163, a memory 164, a frame memory 165, and a host 166.

The multiplexer 161 has a function of selecting one of the wirings POUT [1] to POUT[n] and outputting a signal to the selected wiring OUT.

The multiplexer 161 includes transistors M11[1] to M11[n] and a transistor M12. When a selection signal is input to a wiring SEC, any one of the transistors M11[1] to M11[n] is selected and turned on. Then, a signal is output to the wiring OUT.

A wiring BIAS is connected to a gate of the transistor M12, and a drain current of the transistor M12 is changed in accordance with the potential of the wiring BIAS. The transistor M12 has a function as a current supply, and a potential to be output to the wiring OUT is determined by resistance division with the transistor M7 in each of the pixels 11.

The signal output to the wiring OUT is converted into a digital signal by the A/D converter 162.

The logic circuit 163 has a function of sensing whether or not there is a touch on the sensing pixel 150 on the basis of the signal output from the A/D converter 162. In sensing a touch, the logic circuit 163 outputs a signal to the wiring SENS. Specifically, the H-level potential is supplied to the wiring SENS to turn on the transistor M5 in the pixel 11. When the transistor M5 is turned on, electrical continuity is established between the node FD3 and the node FD2.

The logic circuit 163 has a function of supplying an H-level potential to the wiring SENS connected to a specific pixel among the pixels 11[R], 11[G], and 11[B]. In the case where the user of the information terminal 10 wants to make a mark with red, for example, the user sets red for a signal ColorSET. Receiving the signal ColorSET, the logic circuit 163 supplies an H-level potential to the wiring SENS[R]. The transistor M5 in the pixel 11[R] is turned on with the wiring SENS[R], electrical continuity is established between the node FD3 and the node FD2, and thus the light-emitting element 170 in the pixel 11[R] emits red light. As a result, the user of the information terminal 10 can make a mark with the desired color.

An output result of the A/D converter 162 can be stored in the memory 164. In this manner, the history of an image input to the information terminal 10, such as a mark, can be stored. Image data stored in the memory 164 is synthesized with image data supplied from the host 166 in the frame memory 165, passes through the source driver 15, and displayed in the pixel array 12.

<<Timing Chart>>

Figure 6:
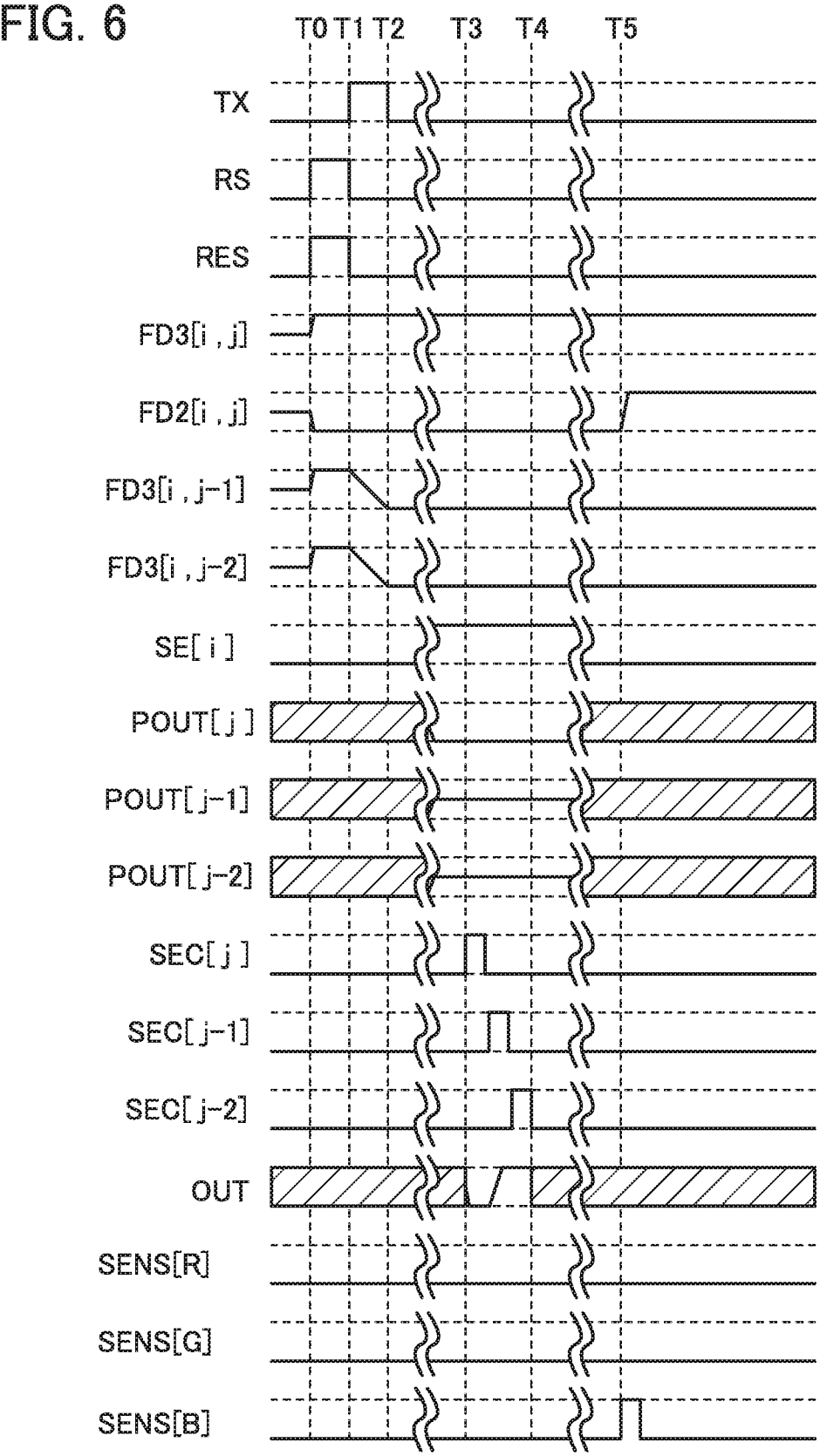
FIG. 6 is a timing chart showing an operation example of an information terminal.

Next, the operation of the information terminal 10 is described in detail with reference to a timing chart in FIG. 6. Note that the timing chart in FIG. 6 shows an example in which the sensing pixel 150 in the pixel 11[i,j] senses a touch and a result of the touch is displayed in the display pixel 110 in the pixel 11[i,j]. Times T0 to T5 are given in FIG. 6 to show operation timings.

The wiring PC1 and a wiring PC2 are each supplied with a constant potential. The wiring PC2 is preferably supplied with a higher potential than the wiring PC1.

First, at Time T0, the potential of the wiring RS becomes an H level, and the potential of the node FD3 is initialized to an H level. At the same time, the potential of the wiring RES also becomes an H level, and the potential of the node FD2 is initialized to an L level.

When the potential of the wiring TX becomes an H level at Time T1, the transistor M6 is turned on, and the potential of the node FD3 is changed in accordance with the amount of light received by the photodiode 190. Here, the case where the pixel 11[i,j] is touched is assumed; therefore, the potential of the node FD3[i,j] remains at an H level, and the potentials of the nodes FD3 in the other pixels, such as the node FD3[i,j−1] and the node FD3[i,j−2], are lowered over time.

When the potential of the wiring TX becomes an L level at Time T2, an exposure period is terminated, and thus decrease in the potentials of the nodes FD3[i,j−1] and FD3[i,j−2] is stopped. The potentials of the nodes FD3[i,j−1] and FD3[i,j−2] become an L level.

From Time T2 to Time T3, an H-level potential is supplied to the wiring SE[i], so that the transistors M8 in the corresponding pixels 11 are turned on. Each of the potentials of the wirings POUT[j], POUT[j−1], and POUT[j−2] becomes a potential which corresponds to the potential of the corresponding node FD3.

From Time T3 to Time T4, the wirings SEC[j], SEC[j−1], and SEC[j−2] sequentially become an H level, and the potentials of the wirings POUT[j], POUT[j−1], and POUT [j−2] are sequentially output from the wiring OUT. An analog signal output from the wiring OUT is converted into a digital signal by the A/D converter 162. The logic circuit 163 receives the digital signal and determines whether there is a touch or not.

At Time T5, the logic circuit 163 supplies an H-level potential to the wiring SENS[B] corresponding to a color specified by the signal ColorSET (it is assumed here that blue [B] is specified by the signal ColorSET). When the potential of the wiring SENS [B] becomes an H level, the transistors M5 in the pixels for B among the pixels 11 are turned on.

The pixel [i,j] corresponds to B and the potential of the node FD3[i,j] is at an H level, and thus the potential of the node FD2[i,j] also becomes an H level. When the potential of the node FD2[i,j] becomes an H level, the transistor M3 in the pixel is turned on and a current flows through the light-emitting element 170, so that the light-emitting element 170 in the pixel emits light.

Note that in the case where another color such as red [R] is selected by the signal ColorSET, the pixel 11[$i,j$−2] corresponding to [R] does not sense a touch, and thus red cannot be displayed. However, the other pixels corresponding to [R], such as the pixel 11[$i,j$+1], senses a touch, and thus the information terminal 10 can display red in the pixels corresponding to [R] in a touched region without any problem.

As described above, the user of the information terminal 10 can make a mark and draw a line such as an underline by light emission of the light-emitting element 170 even when the liquid crystal element 180 performs display.

Note that the capacitance of the capacitor C3 is preferably larger than that of the capacitor C2 in order to transfer data of the node FD3[$i,j$] to the node FD2[$i,j$].

Figure 7:
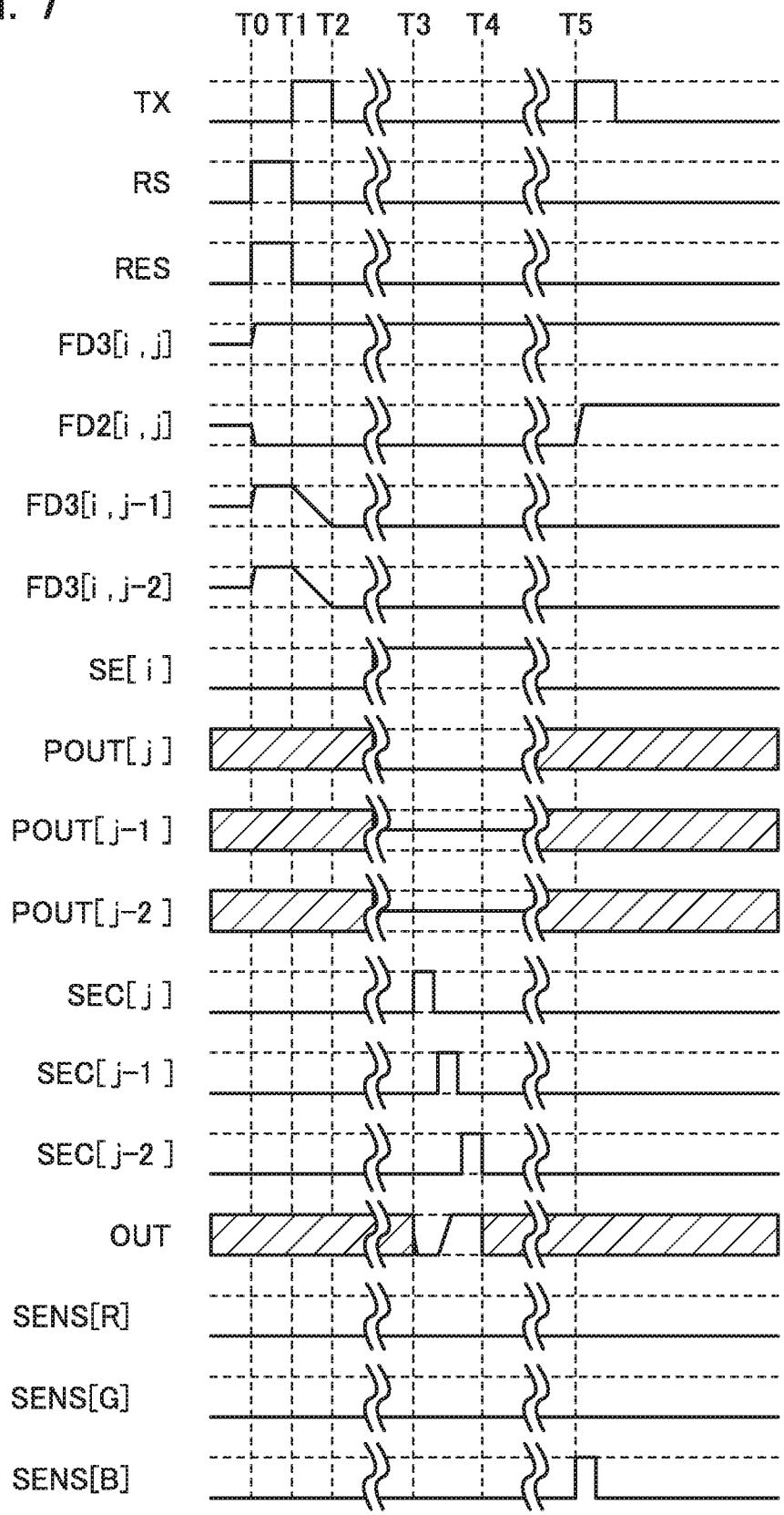
FIG. 7 is a timing chart showing an operation example of an information terminal.

The capacitance of the capacitor C3 does not need to be set larger than that of the capacitor C2 when a driving method shown in FIG. 7 is used. The timing chart shown in FIG. 7 differs from that in FIG. 6 in that the potential of the wiring TX is set to an H level again (the next exposure is started) when the potential of the wiring SENS[B] becomes an H level. By the driving method shown in FIG. 7, data can also be written directly to the node FD2[$i,j$] in the exposure period.

<<Another Structure Example of Pixel>>

Figure 8:
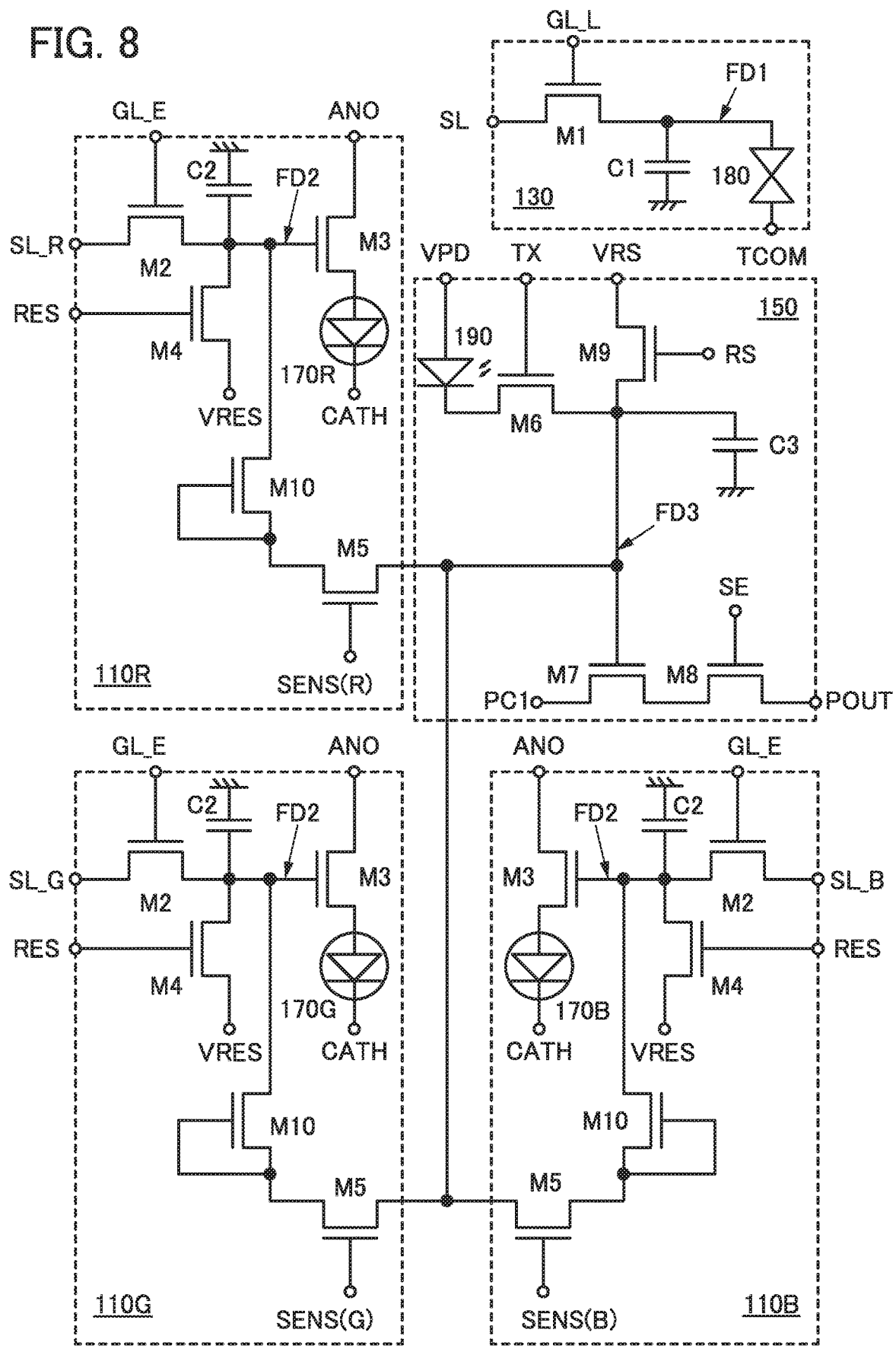
FIG. 8 is a circuit diagram illustrating a structure example of a pixel.

The sensing pixel 150 does not need high definition as compared to the display pixel 130 or the display pixel 110 as long as the sensing pixel 150 senses the approach or contact of a stylus or the like. Therefore, a plurality of display pixels 110 may be provided for one sensing pixel 150. FIG. 8 illustrates such an example.

FIG. 8 illustrates the display pixel 130, the sensing pixel 150, a display pixel 110R, a display pixel 110G, and a display pixel 110B. The display pixel 110R includes a light-emitting element 170R emitting red light, the display pixel 110G includes a light-emitting element 170G emitting green light, and the display pixel 110B includes a light-emitting element 170B emitting blue light. The node FD3 in the sensing pixel 150 is electrically connected to the nodes FD2 in the display pixels 110R, 110G, and 110B.

When the plurality of display pixels 110 are provided for one sensing pixel 150 as described above, the area occupied by the sensing pixels 150 in the information terminal 10 can be reduced, and thus an area obtained by the area reduction of the sensing pixels 150 can be used for the display pixel 130 or the display pixel 110. As a result, the information terminal can have higher definition and higher visibility.

<<Cross-Sectional View of Display Panel>>

Next, a structure example of the information terminal 10 is described with reference to FIG. 9.

Figure 9:
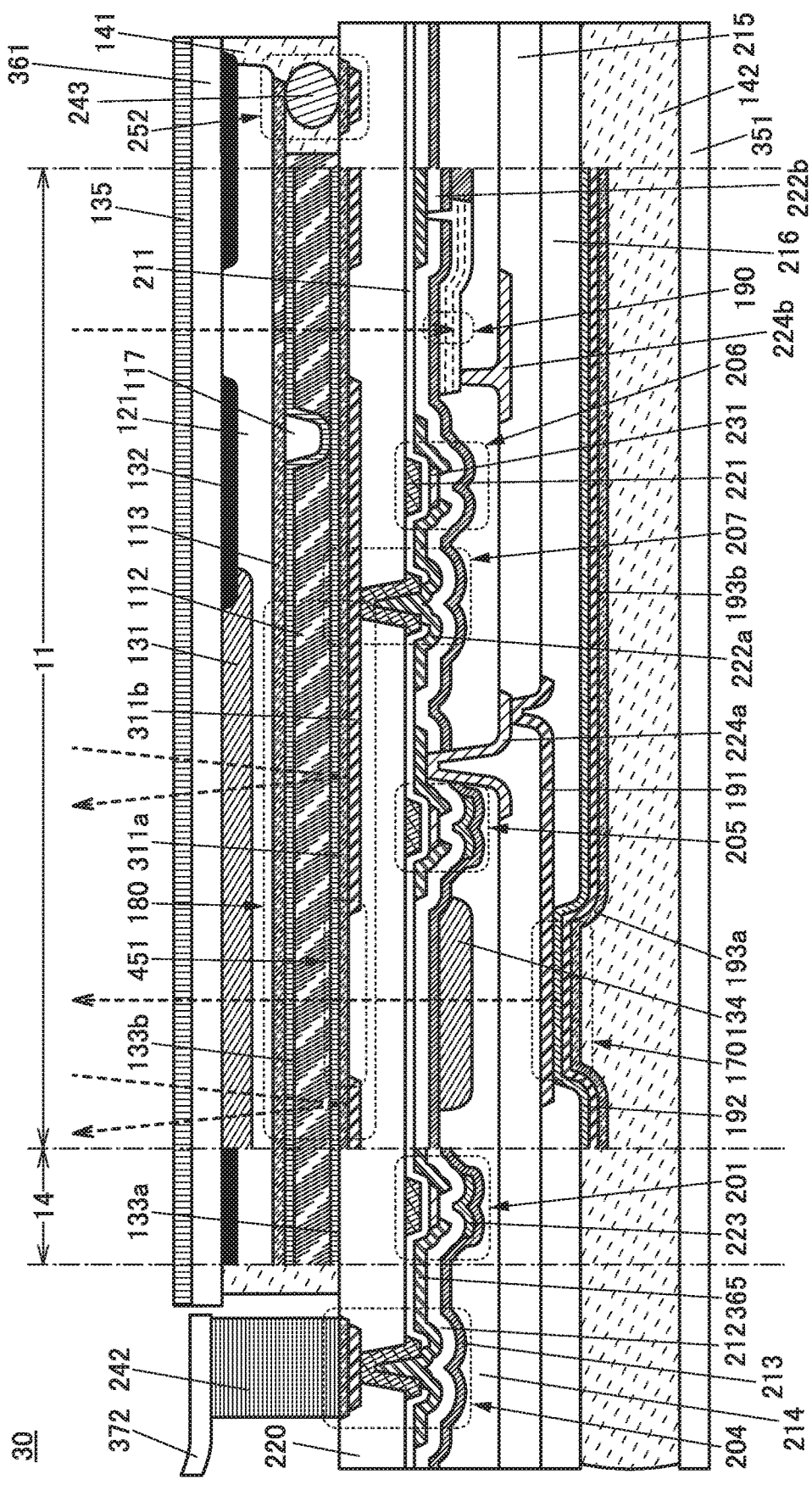
FIG. 9 is a cross-sectional view illustrating a structure example of a display panel.

FIG. 9 is a cross-sectional view of the display panel 30 illustrated in FIG. 2A.

The display panel 30 illustrated in FIG. 9 includes an insulating layer 220 between substrates 351 and 361. The display panel also includes the light-emitting element 170, the photodiode 190, a transistor 201, a transistor 205, a transistor 206, a coloring layer 134, and the like between the substrate 351 and the insulating layer 220. Furthermore, the display panel includes the liquid crystal element 180, the coloring layer 131 and the like between the insulating layer 220 and the substrate 361. The substrate 361 and the insulating layer 220 are bonded with the adhesive layer 141. The substrate 351 and the insulating layer 220 are bonded with an adhesive layer 142.

The transistor 206 is electrically connected to the liquid crystal element 180 and the transistor 205 is electrically connected to the light-emitting element 170. Since the transistors 205 and 206 are formed on a surface of the insulating layer 220 which is on the substrate 351 side, the transistors 205 and 206 can be formed through the same process.

The coloring layer 131, a light-blocking layer 132, an insulating layer 121, and a conductive layer 113 serving as a common electrode of the liquid crystal element 180, an alignment film 133$b$, an insulating layer 117, and the like are provided over the substrate 361. The insulating layer 117 serves as a spacer for holding a cell gap of the liquid crystal element 180.

Insulating layers such as an insulating layer 211, an insulating layer 212, an insulating layer 213, an insulating layer 214, an insulating layer 215, and the like are provided on the substrate 351 side of the insulating layer 220. Part of the insulating layer 211 functions as a gate insulating layer of each transistor. The insulating layer 212, the insulating layer 213, and the insulating layer 214 are provided to cover each transistor and the like. The insulating layer 215 is provided to cover the insulating layer 214. The insulating layers 214 and 215 each function as a planarization layer. Note that an example where the three insulating layers, the insulating layers 212, 213, and 214, are provided to cover the transistors and the like is described here; however, one embodiment of the present invention is not limited to this example, and four or more insulating layers, a single insulating layer, or two insulating layers may be provided. The insulating layer 214 functioning as a planarization layer is not necessarily provided when not needed.

The transistors 201, 205, and 206 each include a conductive layer 221 part of which functions as a gate, conductive layers 222$a$ part of which functions as a source and a drain, and a semiconductor layer 231. Here, a plurality of layers obtained by processing the same conductive film are shown with the same hatching pattern.

The liquid crystal element 180 is a reflective liquid crystal element. The liquid crystal element 180 has a stacked structure of a conductive layer 311$a$, liquid crystal 112, and a conductive layer 113. A conductive layer 311$b$ which reflects visible light is provided in contact with the surface of the conductive layer 311$a$ that faces the substrate 351. The conductive layer 311$b$ includes an opening 451. The conductive layers 311$a$ and 113 transmit visible light. In addition, an alignment film 133$a$ is provided between the liquid crystal 112 and the conductive layer 311$a$ and an alignment film 133$b$ is provided between the liquid crystal 112 and the conductive layer 113. A polarizing plate 135 is provided on an outer surface of the substrate 361.

In the liquid crystal element 180, the conductive layer 311$b$ has a function of reflecting visible light, and the conductive layer 113 has a function of transmitting visible light. Light entering from the substrate 361 side is polarized by the polarizing plate 135, passes through the conductive layer 113 and the liquid crystal 112, and is reflected by the conductive layer 311$b$. Then, the light passes through the liquid crystal 112 and the conductive layer 113 again and reaches the polarizing plate 135. In this case, alignment of the liquid crystal 112 is controlled with a voltage that is applied between the conductive layer 311$b$ and the conductive layer 113, and thus optical modulation of light can be controlled. That is, the intensity of light emitted through the polarizing plate 135 can be controlled. Light other than one in a particular wavelength region of the light is absorbed by the coloring layer 131, and thus, emitted light is red light, for example.

The light-emitting element 170 is a bottom-emission light-emitting element. The light-emitting element 170 has a structure in which a conductive layer 191, an EL layer 192, and a conductive layer 193b are stacked in this order from the insulating layer 220 side. The insulating layer 216 covers an end portion of the conductive layer 191. In addition, a conductive layer 193a is provided to cover the conductive layer 193b. The conductive layer 193b contains a material reflecting visible light, and the conductive layers 191 and 193a contain a material transmitting visible light. Light is emitted from the light-emitting element 170 to the substrate 361 side through the coloring layer 134, the insulating layer 220, the opening 451, the conductive layer 113, and the like.

Here, as illustrated in FIG. 9, the conductive layer 311a transmitting visible light is preferably provided for the opening 451. Accordingly, the liquid crystal 112 is aligned in a region overlapping with the opening 451 as well as in the other regions, in which case an alignment defect of the liquid crystal is prevented from being generated in the boundary portion of these regions and undesired light leakage can be suppressed.

As the polarizing plate 135 provided on an outer surface of the substrate 361, a linear polarizing plate or a circularly polarizing plate can be used. An example of a circularly polarizing plate is a stack including a linear polarizing plate and a quarter-wave retardation plate. Such a structure can reduce reflection of external light. The cell gap, alignment, drive voltage, and the like of the liquid crystal element used as the liquid crystal element 180 are controlled depending on the kind of the polarizing plate so that desirable contrast is obtained.

One of a source and a drain of the transistor 205 is electrically connected to the conductive layer 191 of the light-emitting element 170 through a conductive layer 224a.

One of a source and a drain of the transistor 206 is electrically connected to the conductive layer 311b through a connection portion 207. The conductive layers 311b and 311a are in contact with and electrically connected to each other. Here, in the connection portion 207, the conductive layers provided on both surfaces of the insulating layer 220 are connected to each other through openings in the insulating layer 220.

The photodiode 190 includes a stack of a p-type semiconductor layer, an i-type semiconductor layer, and an n-type semiconductor layer. One of a conductive layer 222b and a conductive layer 224b is connected to the p-type semiconductor layer, and the other is connected to the n-type semiconductor layer. The photodiode 190 has a portion which does not overlap with the coloring layer 131, the light-blocking layer 132, and a conductive layer 311b reflecting visible light. External light enters the photodiode 190 from the portion. The conductive layer 224b has a function of reflecting light transmitted through the photodiode 190.

Note that a diode element formed using a single crystal substrate with a pn junction or a pin junction may also be used for the photodiode 190. Alternatively, a pin diode element formed using an amorphous silicon film, a microcrystalline silicon film, or the like may be used. Note that although an example in which a photodiode is included is described above, another photoelectric conversion element may alternatively be used. For example, a diode-connected transistor may be used. Further alternatively, a variable resistor or the like utilizing a photoelectric effect may be formed using silicon, germanium, selenium, or the like. Alternatively, a photodiode that includes selenium utilizing avalanche multiplication may be used. Such a photodiode can be a highly sensitive light-receiving element in which the amplification of electrons with respect to the amount of incident light is large.

The connection portion 204 is provided in a region where the substrates 351 and 361 do not overlap with each other. The connection portion 204 is electrically connected to the FPC 372 through a connection layer 242. The connection portion 204 has a structure similar to that of the connection portion 207. On the top surface of the connection portion 204, a conductive layer obtained by processing the same conductive film as the conductive layer 311a is exposed. Thus, the connection portion 204 and the FPC 372 can be electrically connected to each other through the connection layer 242.

A connection portion 252 is provided in part of a region where the adhesive layer 141 is provided. In the connection portion 252, the conductive layer obtained by processing the same conductive film as the conductive layer 311a is electrically connected to part of the conductive layer 113 with a connector 243. Accordingly, a signal or a potential input from the FPC 372 connected to the substrate 351 side can be supplied to the conductive layer 113 formed on the substrate 361 side through the connection portion 252.

As the connector 243, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 243, a material capable of elastic deformation or plastic deformation is preferably used. As illustrated in FIG. 9, the connector 243 which is the conductive particle has a shape that is vertically crushed in some cases. With the crushed shape, the contact area between the connector 243 and a conductive layer electrically connected to the connector 243 can be increased, thereby reducing contact resistance and suppressing the generation of problems such as disconnection.

The connector 243 is preferably provided so as to be covered with the adhesive layer 141. For example, the connector 243 is dispersed in the adhesive layer 141 before curing of the adhesive layer 141.

FIG. 9 illustrates an example of the gate driver 14 in which the transistor 201 is provided.

The structure in which the semiconductor layer 231 where a channel is formed is provided between two gates is used as an example of the transistors 201 and 205 in FIG. 9. One gate is formed by the conductive layer 221 and the other gate is formed by a conductive layer 223 overlapping with the semiconductor layer 231 with the insulating layer 212 provided therebetween. Such a structure enables control of threshold voltages of transistors. In that case, the two gates may be connected to each other and supplied with the same signal to operate the transistor. Such a transistor can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display panel in which the number of wirings is increased because of increase in size or definition.

The transistors 201, 205, and 206 are preferably OS transistors. Therefore, an oxide semiconductor is preferably used for the semiconductor layer 231. Examples of the oxide semiconductors that can be used for the semiconductor layer 231 include an In—Ga oxide, an In—Zn oxide, and an In-M-Zn oxide (M is Ti, Ga, Y, Zr, La, Ce, Nd, Sn, or Hf). Note that the oxide semiconductor is not limited to an oxide containing In. The oxide semiconductor may be, for example, a Zn oxide, a Zn—Sn oxide, or a Ga—Sn oxide.

Note that a transistor included in the gate driver 14 and a transistor included in the pixel 11 may have the same structure. The plurality of transistors included in the gate driver 14 may have the same structure or different structures. The plurality of transistors included in the pixel 11 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable display panel can be provided.

The insulating layer 121 is provided on the substrate 361 side to cover the coloring layer 131 and the light-blocking layer 132. The insulating layer 121 may have a function as a planarization layer. The insulating layer 121 enables the conductive layer 113 to have an almost flat surface, resulting in a uniform alignment state of the liquid crystal 112.

An example of the method for manufacturing the display panel 30 is described. For example, the conductive layer 311a, the conductive layer 311b, and the insulating layer 220 are formed in order over a support substrate provided with a separation layer, and the transistor 205, the transistor 206, the light-emitting element 170, the photodiode 190, and the like are formed. Then, the substrate 351 and the support substrate are bonded with the adhesive layer 142. After that, separation is performed at the interface between the separation layer and each of the insulating layer 220 and the conductive layer 311a, whereby the support substrate and the separation layer are removed. Separately, the coloring layer 131, the light-blocking layer 132, the conductive layer 113, and the like are formed over the substrate 361 in advance. Then, the liquid crystal 112 is dropped onto the substrate 351 or 361 and the substrates 351 and 361 are bonded with the adhesive layer 141, whereby the display panel 30 can be manufactured.

A material for the separation layer can be selected such that separation at the interface with the insulating layer 220 and the conductive layer 311a occurs. In particular, it is preferable that a stacked layer of a layer including a high-melting-point metal material, such as tungsten, and a layer including an oxide of the metal material be used as the separation layer, and a stacked layer of a plurality of layers, such as a silicon nitride layer, a silicon oxynitride layer, and a silicon nitride oxide layer be used as the insulating layer 220 over the separation layer. The use of the high-melting-point metal material for the separation layer can increase the formation temperature of a layer formed in a later step, which reduces impurity concentration and achieves a highly reliable display device.

As the conductive layer 311a, an oxide or a nitride such as a metal oxide, a metal nitride, or an oxide such as an oxide semiconductor whose resistance is reduced is preferably used. In the case of using an oxide semiconductor, a material in which at least one of the concentrations of hydrogen, boron, phosphorus, nitrogen, and other impurities and the number of oxygen vacancies is made to be higher than those in a semiconductor layer of a transistor is used for the conductive layer 311a.

As described above, the information terminal 10 described in this embodiment can have low power consumption, high visibility, and a novel structure.

Embodiment 2

In this embodiment, CAC-OS which can be used for the OS transistor in the above embodiment is described.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0), gallium zinc oxide ($Ga_{X4}Zn_{Y4}O_{Z4}$, where X4, Y4, and Z4 are real numbers greater than 0), or the like, and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to the element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not heated, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current (Ion) and high field-effect mobility (μ) can be achieved.

A semiconductor element including a CAC-OS has high reliability. Thus, the CAC-OS is suitably used in a variety of semiconductor devices typified by a display.

Unless otherwise specified, the on-state current in this specification refers to a drain current of a transistor in the on state. Unless otherwise specified, the on state (also sometimes abbreviated to "on") of an n-channel transistor means that the voltage between its gate and source ($V_G$) is higher than or equal to the threshold voltage ($V_{th}$), and the on state of a p-channel transistor means that $V_G$ is lower than or equal to $V_{th}$. For example, the on-state current of an n-channel transistor refers to a drain current that flows when $V_G$ is higher than or equal to $V_{th}$. The on-state current of a transistor depends on a voltage $V_D$ between a drain and a source in some cases.

Unless otherwise specified, the off-state current in this specification refers to a drain current of a transistor in the off state. Unless otherwise specified, the off state (also sometimes abbreviated to "off") of an n-channel transistor means that $V_G$ is lower than $V_{th}$, and the off state of a p-channel transistor means that $V_G$ is higher than $V_{th}$. For example, the off-state current of an n-channel transistor refers to a drain current that flows when $V_G$ is lower than $V_{th}$. The off-state current of a transistor depends on $V_G$ in some cases. Thus, "the off-state current of a transistor is lower than $10^{-21}$ A" may mean there is $V_G$ at which the off-state current of the transistor is lower than $10^{-21}$ A.

The off-state current of a transistor depends on $V_D$ in some cases. Unless otherwise specified, the off-state current in this specification may be off-state current at $V_D$ with an absolute value of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at $V_D$ used in a semiconductor device or the like including the transistor.

In this specification or the like, the terms "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path", "a source (or a first terminal or the like) of a transistor is electrically connected to X through at least Z1 on a first connection path, the first connection path does not include a second connection path, the second connection path includes a connection path through the transistor, a drain (or a second terminal or the like) of the transistor is electrically connected to Y through at least Z2 on a third connection path, and the third connection path does not include the second connection path", and "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2016-116140 filed with Japan Patent Office on Jun. 10, 2016, the entire contents of which are hereby incorporated by reference.

What is claimed is:

1. A display panel comprising:
a light-emitting element;
a first transistor controlling a current flowing through the light-emitting element; and
a touch sensor comprising a photodiode, a second transistor, and a third transistor,
wherein the photodiode is connected by an electrically conductive path to a gate of the third transistor through the second transistor, and
wherein a gate of the first transistor is connected by an electrically conductive path to the gate of the third transistor through a fourth transistor.

2. The display panel according to claim 1,
wherein the touch sensor senses a handwritten information input by a user, and
wherein the handwritten information is displayed by the light-emitting element.

3. The display panel according to claim 1,
wherein the first transistor includes an oxide semiconductor in a channel formation region.

4. An information terminal comprising:
the display panel according to claim 1; and
a battery electrically connected to the display panel.

5. The display panel according to claim 1,
wherein a gate of the first transistor is connected by an electrically conductive path to one of a source and a drain of the fourth transistor, and
wherein the other of the source and the drain of the fourth transistor is connected by an electrically conductive path to the gate of the third transistor.

6. The display panel according to claim 1,
wherein the gate of the first transistor is connected by an electrically conductive path to the gate of the third transistor through the fourth transistor and a fifth transistor.

7. A display panel comprising:
a liquid crystal element;
a light-emitting element;
a first transistor controlling a current flowing through the light-emitting element; and
a touch sensor comprising a photodiode, a second transistor, and a third transistor,
wherein the photodiode is connected by an electrically conductive path to a gate of the third transistor through the second transistor, and
wherein a gate of the first transistor is connected by an electrically conductive path to the gate of the third transistor through a fourth transistor.

8. The display panel according to claim 7,
wherein the liquid crystal element displays an image,
wherein the touch sensor senses a handwritten information input by a user and adds the handwritten information to the image, and
wherein the handwritten information is displayed by the light-emitting element.

9. The display panel according to claim 7,
wherein the liquid crystal element is a reflective liquid crystal element.

10. The display panel according to claim 7,
wherein the first transistor includes an oxide semiconductor in a channel formation region.

11. An information terminal comprising:
the display panel according to claim 7; and
a battery electrically connected to the display panel.

12. The display panel according to claim 7,
wherein the gate of the first transistor is connected by an electrically conductive path to the gate of the third transistor through the fourth transistor and a fifth transistor.

13. A display panel comprising:
a light-emitting element over a first substrate;
a first transistor electrically connected to the light-emitting element;
a touch sensor over the first substrate, the touch sensor comprising a photodiode, a second transistor, and a third transistor; and
a liquid crystal element over the light-emitting element,
wherein the photodiode is connected by an electrically conductive path to a gate of the third transistor through the second transistor,
wherein a gate of the first transistor is connected by an electrically conductive path to the gate of the third transistor through at a fourth transistor,
wherein the liquid crystal element displays an image,
wherein the touch sensor senses a handwritten information input by a user and adds the handwritten information to the image, and
wherein the handwritten information is displayed by the light-emitting element.

14. The display panel according to claim 13,
wherein the liquid crystal element is a reflective liquid crystal element.

15. An information terminal comprising:
the display panel according to claim 13; and
a battery electrically connected to the display panel.

16. The display panel according to claim 13,
wherein the gate of the first transistor is connected by an electrically conductive path to the gate of the third transistor through the fourth transistor and a fifth transistor.

* * * * *